United States Patent
Lee et al.

(10) Patent No.: US 9,036,033 B2
(45) Date of Patent: May 19, 2015

(54) DIGITAL IMAGE PROCESSING APPARATUS AND METHOD OF ESTIMATING GLOBAL MOTION OF IMAGE

(71) Applicant: Samsung Techwin Co., Ltd., Changwon (KR)

(72) Inventors: Hwal-suk Lee, Changwon (KR); Sang-Ji Park, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 140 days.

(21) Appl. No.: 13/934,441

(22) Filed: Jul. 3, 2013

(65) Prior Publication Data

US 2014/0176740 A1  Jun. 26, 2014

(30) Foreign Application Priority Data

Dec. 21, 2012  (KR) .................. 10-2012-0151346

(51) Int. Cl.
| | |
|---|---|
| *H04N 5/228* | (2006.01) |
| *H04N 5/235* | (2006.01) |
| *H04N 5/225* | (2006.01) |
| *H04N 5/232* | (2006.01) |
| *G06T 7/20* | (2006.01) |

(52) U.S. Cl.
CPC ....... *H04N 5/23254* (2013.01); *H04N 5/23267* (2013.01); *G06T 7/204* (2013.01); *G06T 2207/30244* (2013.01)

(58) Field of Classification Search
CPC .................. H04N 19/00587–19/00745; H04N 5/23248–5/2329
USPC .............. 348/208.1–208.99, 222.1, 169–172
See application file for complete search history.

(56) References Cited

U.S. PATENT DOCUMENTS

| | | | | |
|---|---|---|---|---|
| 7,773,828 | B2* | 8/2010 | Sakata et al. .................. | 382/294 |
| 7,969,470 | B2* | 6/2011 | Kishida .................... | 348/208.14 |
| 8,175,160 | B1* | 5/2012 | Arici et al. ............... | 375/240.16 |
| 2006/0244836 | A1* | 11/2006 | Batur ......................... | 348/208.1 |
| 2007/0236578 | A1* | 10/2007 | Nagaraj et al. ........... | 348/208.99 |
| 2008/0273597 | A1* | 11/2008 | Kovalenko et al. ...... | 375/240.16 |
| 2009/0135911 | A1* | 5/2009 | Au et al. .................. | 375/240.16 |
| 2011/0176013 | A1* | 7/2011 | Robertson et al. ......... | 348/208.4 |
| 2011/0176014 | A1* | 7/2011 | Hong et al. ............... | 348/208.4 |
| 2011/0242339 | A1* | 10/2011 | Ogawa ...................... | 348/208.4 |
| 2013/0033612 | A1* | 2/2013 | Wu et al. ................... | 348/208.6 |
| 2013/0100303 | A1* | 4/2013 | Tsai et al. ................. | 348/208.1 |
| 2013/0147974 | A1* | 6/2013 | Ju et al. ..................... | 348/208.1 |
| 2013/0294519 | A1* | 11/2013 | Gilmutdinov et al. ... | 375/240.16 |

FOREIGN PATENT DOCUMENTS

| | | |
|---|---|---|
| EP | 1659535 A2 | 5/2006 |
| EP | 1659801 B1 | 7/2012 |
| KR | 10-0891768 B1 | 4/2009 |
| KR | 10-2012-0072353 A | 7/2012 |

* cited by examiner

*Primary Examiner* — Chia-Wei A Chen
(74) *Attorney, Agent, or Firm* — Sughrue Mion, PLLC (57) ABSTRACT

Provided are a digital image processing apparatus which corrects a position of each of a plurality of template motion vectors of an image frame of a captured image by considering relative positions of neighboring motion vectors respectively similar to each of the template motion vectors, calculates a score of each of the template motion vectors by considering a number of the neighboring motion vectors, and selects a global motion vector representing the image frame based on the score, and a method of estimating a global motion of an image to stabilize the captured image using the global motion.

18 Claims, 6 Drawing Sheets

|  | MV = (X, Y) | CONFIDENCE (C) |
|---|---|---|
| #1 | (−7,3) | 0.2 |
| #2 | (−4,2) | 0.3 |
| #3 | (−4,−2) | 0.1 |
| #4 | (5,2) | 0.5 |

(REFERENCE : TMV = (−5,0))

FIG. 4B

|  | MV* = (X,Y) | ED |
| --- | --- | --- |
| RELATED ART TECHNOLOGY 1 ☆1 | (5,2) | 10.12 |
| RELATED ART TECHNOLOGY 2 ☆2 | (−0.5,2) | 4.92 |
| RELATED ART TECHNOLOGY 3 ☆3 | (1.3,1.6) | 6.45 |

FIG. 4C

| | MV = (X, Y) | CONFIDENCE (C) | NEIGHBORING MV | MV WHOSE POSITION IS CORRECTED | SCORE (S) |
|---|---|---|---|---|---|
| #1 | (−7,3) | 0.2 | #2,#3 | (−5,0.167) | $0.2+2^2 \times 0.75=3.2$ |
| #2 | (−4,2) | 0.3 | #1,#3 | (−5,0.167) | $0.3+2^2 \times 0.75=3.3$ |
| #3 | (−4,−2) | 0.1 | #1,#2 | (−5,0.167) | $0.1+2^2 \times 0.75=3.1$ |
| #4 | (5,2) | 0.5 | − | (5,2) | 0.5 |

FIG. 5A

FIG. 5B

DIGITAL IMAGE PROCESSING APPARATUS AND METHOD OF ESTIMATING GLOBAL MOTION OF IMAGE

CROSS-REFERENCE TO RELATED PATENT APPLICATION

This application claims priority from Korean Patent Application No. 10-2012-0151346, filed on Dec. 21, 2012, in the Korean Intellectual Property Office, the disclosure of which is incorporated herein in its entirety by reference.

BACKGROUND

1. Field

Apparatuses and methods consistent with exemplary embodiments relate to estimating a global motion of an image, and more particularly, to a global motion vector representing a global motion of an image frame of a captured image and estimating a global motion of an image.

2. Description of the Related Art

As demands for portable photographing apparatuses and/or closed-circuit televisions (CCTVs) have rapidly increased recently, attempts have been actively made to reduce image blurring associated with the movement of photographing apparatuses. Image blurring occurs when a photographing apparatus is moved intentionally or unintentionally, for example, when a portable handheld photographing apparatus is shaken during shooting or when a CCTV which is fixedly attached at a designated position is shaken due to an external vibration.

To reduce image blurring associated with the movement of a photographing apparatus, digital image processing technologies such as global motion estimation technologies to obtain a plurality of candidate motion vectors for an image frame of a captured image, and then, estimate a global motion of the image frame of the captured image based on the plurality of candidate motion vectors have been suggested.

However, the global motion estimation accuracy of related art global motion estimation technologies is usually low, and when a moving object or much noise exists in the captured image, or the image quality is not good, it is difficult to obtain an accurate global motion, thereby failing to reduce blurring.

Accordingly, there is a need for image processing technologies which may more accurately estimate a global motion even when a moving object or much noise exists in the captured image, or the image quality is not good.

SUMMARY

One or more exemplary embodiments provide a digital image processing apparatus which may reduce image blurring by accurately estimating a global motion of an image frame even when a moving object or much noise exists in a captured image, or the image quality is not good, and a method of estimating a global motion of an image.

The technical problems addressed by the inventive concept are not limited to the above-described ones and one of ordinary skill in the art may understand from the following description that other technical problems can be addressed.

According to an aspect of an exemplary embodiment, there is provided a digital image processing apparatus including: a template motion vector obtaining unit configured to obtain template motion vectors respectively corresponding to a plurality of templates of a plurality of different areas in an image frame of a captured image; a position correcting unit configured to correct a position of each of the template motion vectors based on a weighted sum of each of the template motion vectors and at least one neighboring motion vector neighboring each of the template motion vectors; a score calculating unit configured to calculate a score of each of the template motion vectors based on a confidence of each of the template motion vectors and a number of the at least one neighboring motion vector corresponding to each of the template motion vectors; and a global motion estimating unit configured to select a global motion vector representing the image frame from among the template motion vectors, based on the score calculated by the score calculating unit.

The weighted sum may be calculated by using a confidence of each of the template motion vectors and a confidence of each of the at least one neighboring motion vector corresponding to each of the template motion vectors.

Each of the at least one neighboring motion vector may be a motion vector whose Euclidean distance from a template motion vector corresponding to the at least one neighboring motion vector is less than a threshold value.

The digital image processing apparatus may further include a stabilizing unit that stabilizes the captured image including the image frame based on the global motion vector.

According to an aspect of another an exemplary embodiment, there is provided a method of estimating a global motion of an image, the method including: obtaining template motion vectors respectively corresponding to a plurality of templates of a plurality of different areas in an image frame of a captured image; correcting a position of each of the template motion vectors based on a weighted sum of each of the template motion vectors and at least one neighboring motion vector neighboring with each of the template motion vectors; calculating a score of each of the template motion vectors based on a confidence of each of the template motion vectors and a number of the at least one neighboring motion vector corresponding to each of the template motion vectors; and selecting a global motion vector representing the image frame from among the template motion vectors, based on the score calculated by the score calculating unit.

The weighted sum may be calculated by using a confidence of each of the template motion vectors and a confidence of each of the at least one neighboring motion vector corresponding to each of the template motion vectors.

Each of the at least one neighboring motion vector may be a motion vector whose Euclidean distance from a template motion vector corresponding to the neighboring motion vector is less than a threshold value.

The method may further include stabilizing based on the global motion vector the captured image including the image frame.

According to another aspect, there is provided a non-transitory computer-readable recording medium having recorded thereon a program for executing the above method.

BRIEF DESCRIPTION OF THE DRAWINGS

The above and other aspects will become more apparent by describing in detail exemplary embodiments with reference to the attached drawings, in which.

DETAILED DESCRIPTION OF THE EXEMPLARY EMBODIMENTS

It will thus be appreciated that one of ordinary skill in the art will be able to devise various arrangements which, although not explicitly described or shown herein, embody the principles of the inventive concept and are included within the spirit and scope thereof. Furthermore, all examples and conditional language recited herein are principally expressly intended only for pedagogical purposes and for aiding the reader to understand the principles of the inventive concept contributed by the inventors to furthering the art, and are to be construed without limitation to such specifically recited examples and conditions. Moreover, all statements herein reciting principles, aspects, and exemplary embodiments of the inventive concept, as well as specific examples thereof, are intended to encompass both structural and functional equivalents thereof. Additionally, it is intended that such equivalents include both currently known equivalents and equivalents to be developed in the future, i.e., any elements developed or that will be developed to perform the same function, regardless of their structure.

The functions of various components illustrated in the drawings may be related to proper software and may be provided not only via hardware capable of executing the software but also via dedicated hardware for the functions. When the functions are provided by a processor, the functions may be provided by a single dedicated processor, a single shared processor, or a plurality of individual processors that may be partially shared. Furthermore, the terms "processor" and "control unit" are not limited to hardware capable of executing software and may implicatively include a digital signal processor (DSP), read-only memory (ROM), or random access memory (RAM) for storing the software, and a non-volatile storage device without limitation. Examples of the processor and the control unit may also include other well-known hardware.

The objects, features, and advantages of the inventive concept will become more apparent by describing in detail exemplary embodiments thereof with reference to the attached drawings. However, when publicly known techniques or structures related to the present inventive concept may unnecessarily make the inventive concept unclear, the detailed description will be omitted.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The inventive concept will now be described more fully with reference to the accompanying drawings, in which exemplary embodiments of the invention are shown.

Figure 1:
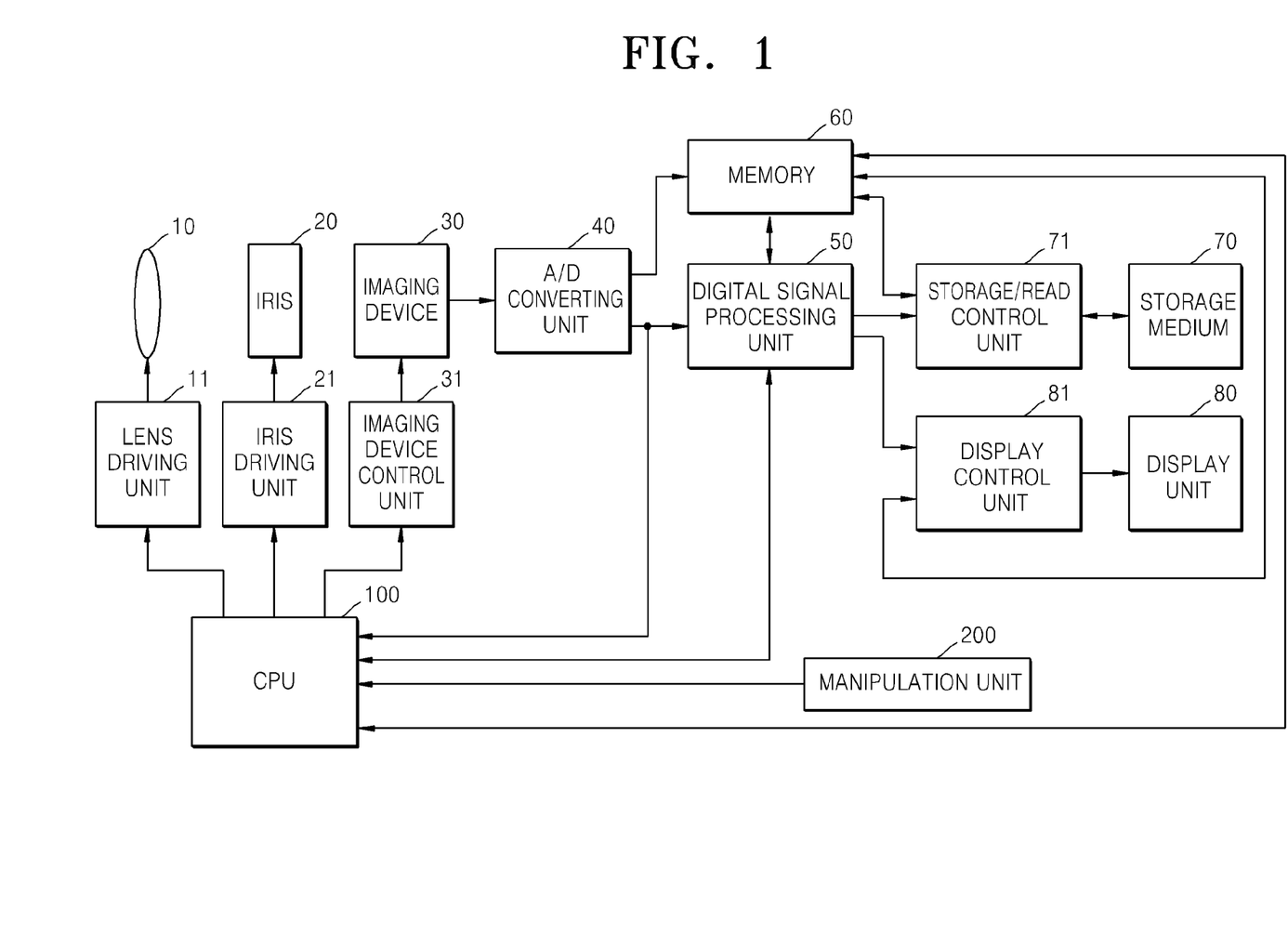
FIG. 1 is a block diagram illustrating a digital image processing apparatus according to an exemplary embodiment.
Figure 2:
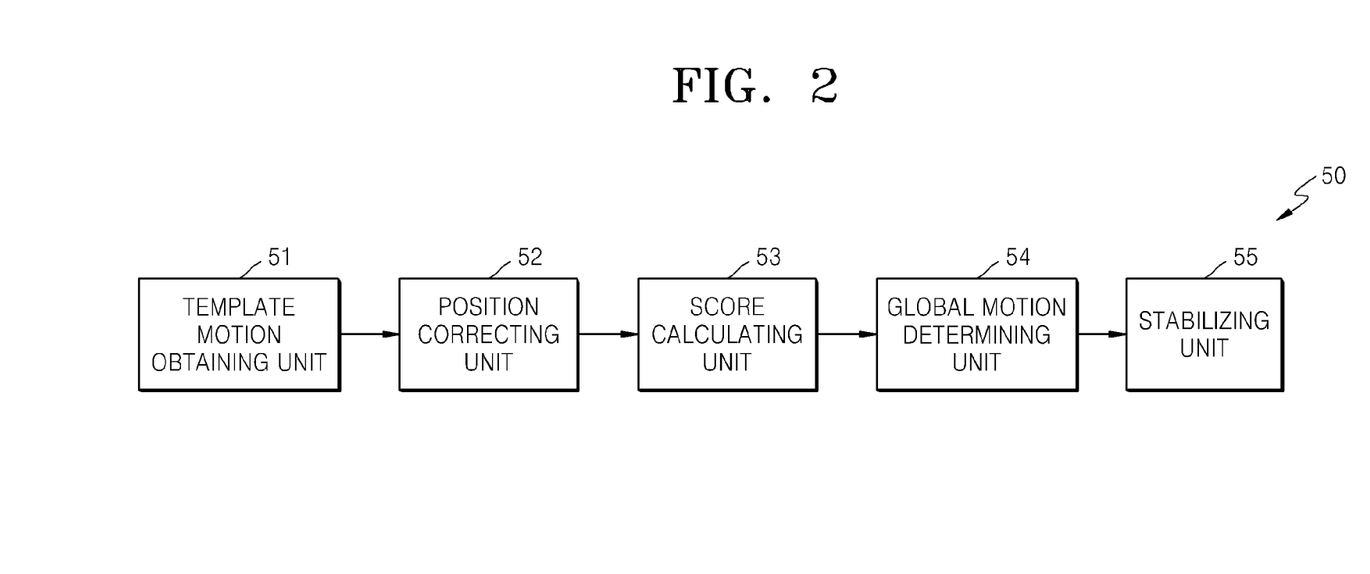
FIG. 2 is a block diagram illustrating a digital signal processing unit of the digital image processing apparatus of FIG. 1, according to an exemplary embodiment.

FIG. 1 is a block diagram illustrating a digital image processing apparatus according to an exemplary embodiment. FIG. 2 is a block diagram illustrating a digital signal processing unit 50 of the digital image processing apparatus of FIG. 1, according to an exemplary embodiment.

Referring to FIG. 1, an overall operation of the digital image processing apparatus is controlled by a central processing unit (CPU) 100. The digital image processing apparatus includes a manipulation unit 200 including a plurality of keys that respectively generate an electrical signal in response to a user's input. The electrical signal output from the manipulation unit 200 may be transmitted to the CPU 100 which controls the digital image processing apparatus according to the electrical signal.

In a photographing mode, when the electrical signal is sent to the CPU 100, the CPU 100 detects the electrical signal, and controls a lens driving unit 11, an iris driving unit 21, and an imaging device control unit 31 to respectively control a position of a lens 10, an opening degree of an iris 20, and a sensitivity of an imaging device 30. The imaging device 30 generates data of an image frame of a captured image according to incident light thereon, and an analog/digital (A/D) converting unit 40 converts the data, which is analog data output from the imaging device 30, into digital data. According to characteristics of the imaging device 30, the A/D converting unit 40 may not be required. The elements of the digital image processing apparatus may be collectively referred to as a data obtaining unit. The data obtaining unit does not have to include all of the elements and any element which may obtain data of the captured image from the incident light may be included in the data obtaining unit.

The data output from the imaging device 30 may be input to the digital signal processing unit 50 directly or through a memory 60, and if necessary, may also be input to the CPU 100. The memory 60 may be ROM or RAM. The digital signal processing unit 50 may perform digital signal processing such as gamma correction or white balancing, if necessary. Also, as will be described below in reference to FIG. 2, the digital signal processing unit 50 may include a template motion vector obtaining unit 51, a position correcting unit 52, a score calculating unit 53, a global motion estimating unit 54, and a stabilizing unit 55, to reduce image blurring associated with movement of a photographing apparatus including the digital image processing apparatus. The template motion vector obtaining unit 51, the position correcting unit 52, the score calculating unit 53, the global motion estimating unit 54, and the stabilizing unit 55 may be variously modified, for example, they may be elements separate from the digital signal processing unit 50 or elements of another unit. In addition, each of at least some of the template motion vector obtaining unit 51, the position correcting unit 52, the score calculating unit 53, the global motion estimating unit 54, and the stabilizing unit 55 may be a predetermined program module such as an operating system or an application program module, and may be stored physically in various well-known storage devices. Also, the program modules may be stored in a remote control storage device which may communicate with the digital image processing apparatus. Examples of the program modules may include, but are not limited to, a routine, a sub-routine, an object, a component, and a data structure which perform a specific task or implement a specific abstract data type as will be described below. Functions of the template motion vector obtaining unit 51, the position correcting unit 52, the score calculating unit 53, the global motion estimating unit 54, and the stabilizing unit 55 will be explained below.

The data of the captured image output from the digital signal processing unit 50 is transmitted to a display control unit 81 directly or through the memory 60. The display control unit 81 controls a display unit 80 to display the captured image on the display unit 80. The data of the captured image output from the digital signal processing unit 50 is input to a storage/read control unit 71 directly or through the memory 60. The storage/read control unit 71 stores the data of the captured image in a storage medium 70 according to the electrical signal from the user or automatically. The storage/read control unit 71 may read the data of the captured image from a captured image file stored in the storage medium 70, and input the data to the display control unit 81 through the memory 60 or another path, to display the captured image on the display unit 80. The storage medium 70 may be detachably or permanently attached to the digital image processing apparatus.

Stabilizing a captured image by using the digital image processing apparatus means that a position of an image frame is corrected based on another image frame constituting the captured image so that even when a photographing apparatus including the digital image processing apparatus is moved or shaken, a position of an object in image frames of the captured image remains constant.

To this end, the digital image processing apparatus obtains an image frame of the captured image by using the data obtaining unit.

The template motion vector obtaining unit 51 matches the image frame of the captured image to a plurality of templates of different areas in the image frame and obtains template motion vectors corresponding to the templates.

In particular, when the template motion vectors of the image frame are obtained, since the plurality of templates of the different areas in the image frame are used, even when a moving object exists in the captured image, a global motion may be estimated based on template motion vectors of templates which are not affected by the moving object, and thus, the global motion estimation is less affected by the moving object.

The position correcting unit 52 corrects a position of each of the template motion vectors based on a weighted sum of each of the template motion vectors obtained by the template motion vector obtaining unit 51 and at least one neighboring motion vector neighboring with each of the template motion vectors.

In this case, a neighboring motion vector, which belongs to a set $N_i$ of neighboring motion vectors corresponding to a template motion vector $MV_i$, may be a motion vector $MV_j$ whose Euclidean distance (ED) from the template motion vector $MV_i$ is less than a threshold value as shown below.

$$N_i = \{j | ED(MV_i, MV_j) \leq TH, j \in \Delta \text{ and } j \neq i\}, \quad (1)$$

where ED is the Euclidian Distance, $\Delta$ is a set of MV index and TH is threshold value As such, the global motion estimation accuracy is improved by considering not only a position and a confidence of each of the template motion vectors but also relative positions of neighboring motion vectors similar to each of the template motion vectors. That is, an extracted template motion vector is assumed to be inaccurate and the extracted template motion vector is corrected to the maximum.

For example, when a confidence of each of the template motion vectors is low and a global motion is estimated based on the template motion vectors, it is difficult to accurately estimate a global motion.

Accordingly, in order to improve the estimation accuracy, the present embodiment considers not only a position and a confidence of each of the template motion vectors but also relative positions of neighboring motion vectors similar to each of the template motion vectors.

In addition, a weighted sum of each of the template motion vectors and at least one neighboring motion vector corresponding to each of the template motion vectors may be calculated by using a confidence of each of the template motion vectors and its at least one neighboring motion vector as a weight. Accordingly, position correction $MV_i'$ of each of the template motion vectors may be performed by calculating a weighted sum as shown in Equation 2.

$$MV_i' = \sum_{k \in N, k=i} MV_k C_k \Bigg/ \sum_{k \in N, k=i} C_k, \quad (2)$$

where $C_k$ is a confidence of a motion vector $MV_k$.

The score calculating unit 53 calculates a score of each of the template motion vectors based on a confidence of each of the template motion vectors whose positions are corrected by the position correcting unit 52 and a number of neighboring motion vectors corresponding to each of the template motion vectors.

In this case, a score $S_i$ of a template motion vector may be calculated by multiplying a predetermined score weight W by a square of a number $|N_i|$ of neighboring motion vectors corresponding to the template motion vector and adding a confidence $C_i$ of the template motion vector to a resultant value as shown in Equation 3.

When a position of each of the template motion vectors is corrected and when a score of each of the template motion vectors is calculated, the global motion estimation accuracy is improved since not only a position and a confidence of each of the template motion vectors but also a number of motion vectors similar to each of the template motion vectors are considered.

In this case, the score weight W may be a predetermined constant value, instead of a variable value that varies according to the template motion vectors. Accordingly, the score weight W may be commonly applied to the template motion vectors.

$$S_i = C_i + |N_i|^2 W \quad (3)$$

The global motion estimating unit 54 selects a global motion vector representing a global motion of the image frame from among the template motion vectors, based on the score of each of the template motion vectors calculated by the score calculating unit 53.

Once the global motion estimating unit 54 selects the global motion vector of the image frame, the stabilizing unit 55 may stabilize the captured image including the image frame based on the global motion vector.

The captured image including the image frame may be stabilized by using a series of image processing processes such as a process of moving the image frame according to the global motion vector or a process of correcting data of the image frame according to the global motion vector.

For example, when the global motion vector of the image frame is (i, j), the data of the image frame may be corrected such that pixel (x+i, y+j) of the image frame has data of pixel (x, y), for example, a pixel value of pixel (x, y). However, this is only for convenience of explanation and the present embodiment is not limited thereto. Any of related art well-known global motion-based stabilization technologies may be used.

Figure 3:
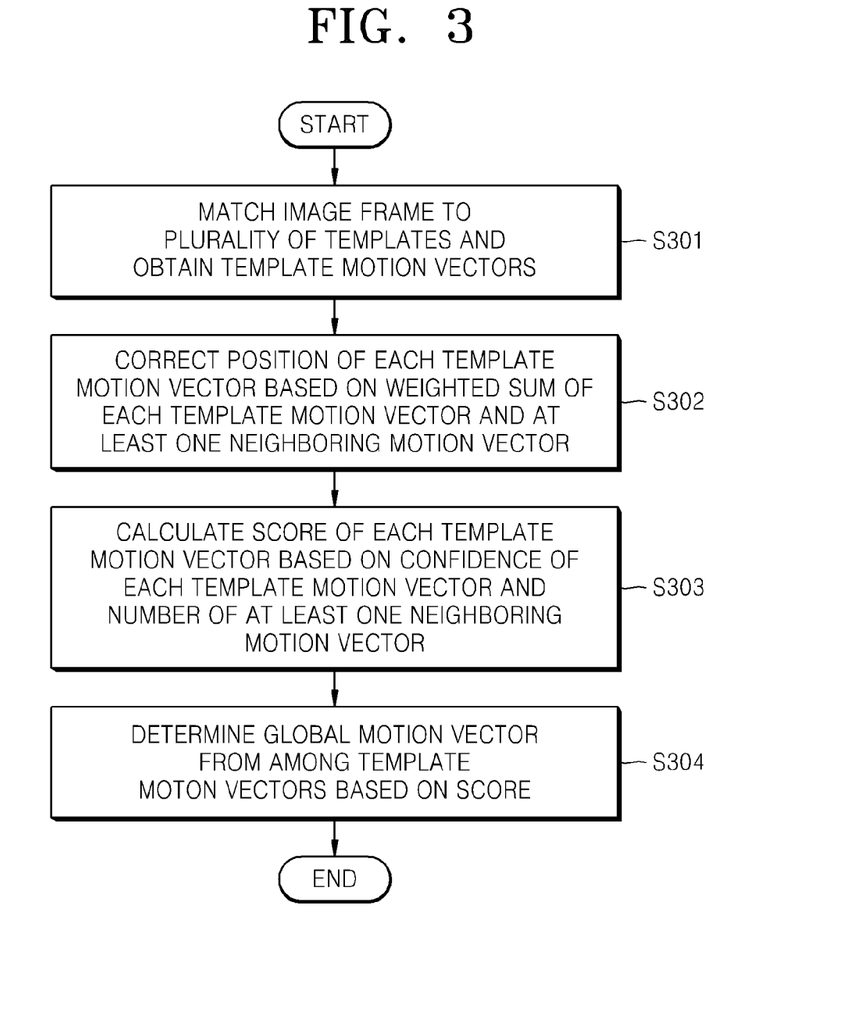
FIG. 3 is a flowchart illustrating a method of estimating a global motion, according to an exemplary embodiment.

FIG. 3 is a flowchart illustrating a method of estimating a global motion, according to an exemplary embodiment. A method of transmitting image data according to the present embodiment may be performed by the digital image processing apparatus and/or the digital signal processing unit 50 of FIGS. 1 and/or 2. Accordingly, the same structures or features as those described with regard to the digital image processing apparatus and/or the digital signal processing unit 50 of FIG. 1 and/or 2 will not be explained again.

Referring to FIG. 3, in operation S301, an image frame of a captured image is matched to a plurality of templates of different areas in the image frame and template motion vectors respectively corresponding to the templates are obtained.

In operation S302, a position of each of the template motion vectors is corrected based on a weighted sum of each of the template motion vectors obtained in operation S301 and at least one neighboring motion vector neighboring with each of the template motion vectors.

In operation S303, a score of each of the template motion vectors is calculated based on a confidence of each of the template motion vectors whose positions are corrected in operation S302 and a number of the at least one neighboring motion vector corresponding to each of the template motion vectors.

In operation S304, a global motion vector representing the image frame is selected from among the template motion vectors based on the score calculated in operation S303.

The method of estimating the global motion according to the present embodiment may easily calculate a global motion vector MV* when a plurality of candidate motion vectors and confidences of the candidate motion vectors are $(MV_1, C_1)$, $(MV_2, C_2)$, $(MV_3, C_3)$, ..., and $(MV_M, C_M)$.

Figure 4A:
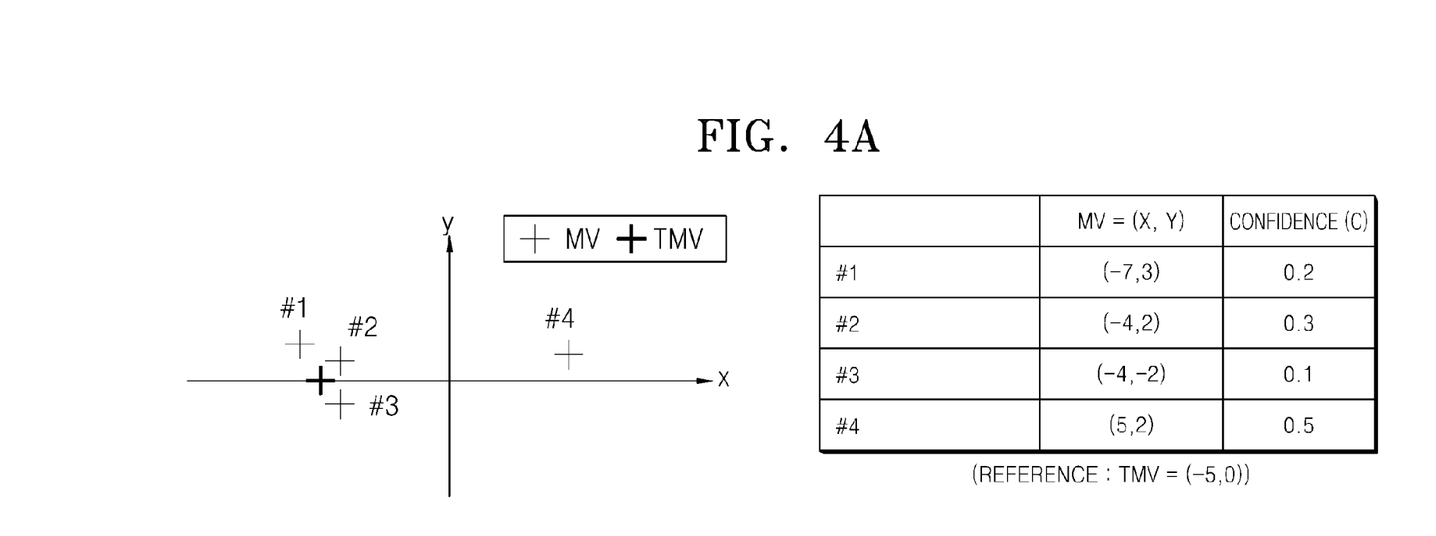
FIGS. 4A through 4C are diagrams illustrating a process of estimating a global motion, for explaining a difference between related art motion estimation technologies and a method of estimating a global motion according to the present inventive concept.
Figure 4B:
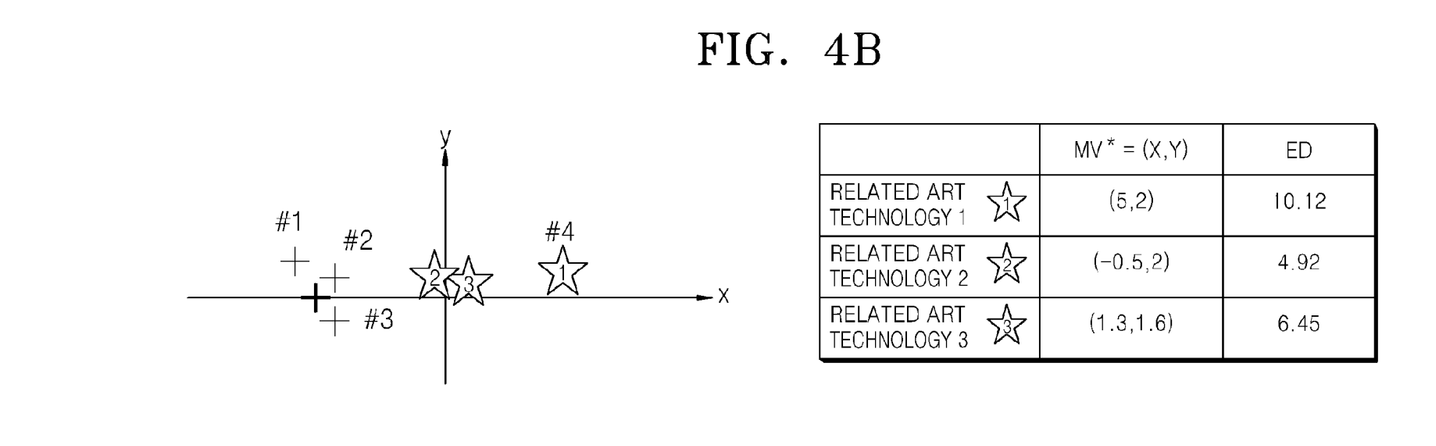
Figure 4C:
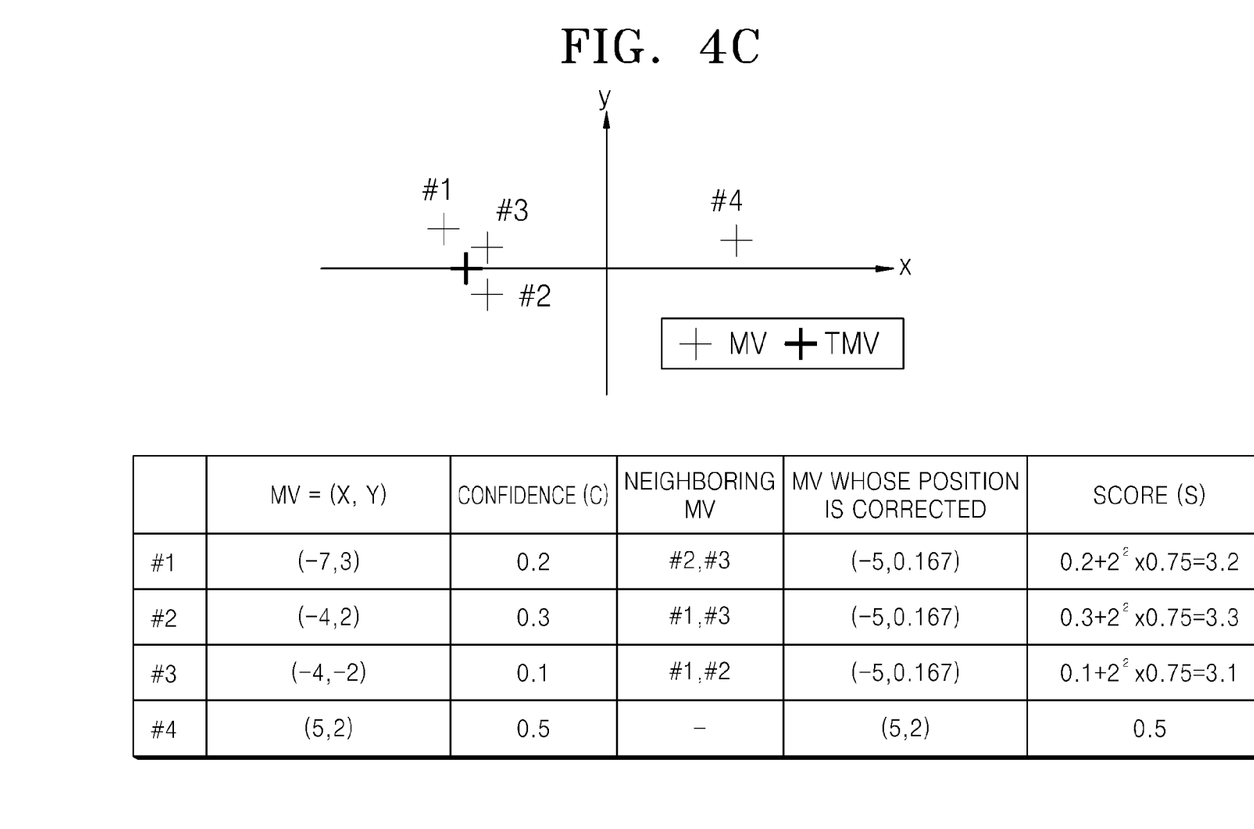

FIGS. 4A through 4C are diagrams illustrating a process of estimating a global motion for explaining a difference between related art global motion estimation technologies and a method of estimating a global motion according to the present invention.

In FIG. 4A, a plurality of candidate motion vectors and confidences of the candidate motion vectors are $(MV_1, C_1)$, $(MV_2, C_2)$, $(MV_3, C_3)$, ..., and $(MV_M, C_M)$.

Referring to FIG. 4A, four candidate motion vectors #1, #2, #3, and #4 respectively have positions (−7, 3), (−4, 2), (−4, −2), and (5, 2) and are set to respectively have confidences 0.2, 0.3, 0.1, and 0.5.

It is assumed that a true motion vector (TMV) of the image frame is (−5, 0). That is, when a value of a global motion vector closest to the TMV, that is, an ED between the global motion vector and the TMV, is minimized, the global motion vector is most accurately estimated.

FIG. 4B illustrates results of global motion estimation according to the related art global motion estimation technologies.

The related art global motion estimation technologies to be compared with the method of estimating the global motion according to the present embodiment are three related art technologies 1 through 3 disclosed in S. Erturk, "Digital Image Stabilization with Sub-Image Phase Correlation Based Global Motion Estimation", IEEE Transactions on Consumer Electronics, Vol. 49, 2003, 1320-1325.

As described above, each of the related art technologies 1 through 3 calculates a global motion vector MV* when a plurality of candidate motion vectors and confidences of the candidate motion vectors are $(MV_1, C_1)$, $(MV_2, C_2)$, $(MV_3, C_3)$, ..., and $(MV_M, C_M)$.

The related art technology 1 is a maximum confidence-based technology wherein a motion vector $MV_i^*$ having a maximum confidence is selected from among the candidate motion vectors as the global motion vector MV* as shown in Equation 4.

$$MV^* = MV_{i^*}, \text{ where } i^* = \underset{i \in \Delta}{\operatorname{argmax}} C_i \text{ and } \Delta = \{1, 2, \ldots, M\} \quad (4)$$

The related art technology 2 is a weighted sum-based technology wherein a result obtained by multiplying the candidate motion vectors by the confidences to obtain resultant values and summing the resultant values is selected as the global motion vector MV* as shown in Equation 5.

$$MV^* = \left(\sum_{i=1}^{M} MV_i \cdot C_i\right) \bigg/ \sum_{i=1}^{M} C_i. \quad (5)$$

The related art technology 3 is a selective weighted sum-based technology wherein m candidate motion vectors are orderly selected according to a level of confidence from among the candidate motion vectors and also a result obtained by performing a weighted sum operation on the m candidate motion vectors is selected as the global motion vector MV* as shown Equation 6.

$$MV^* = \left(\sum_{i=1}^{m} MV_i' \cdot C_i'\right) \bigg/ \sum_{i=1}^{m} C_i', \text{ where } MV_i' \text{ is the } MV \quad (6)$$

with the $i$th large $C$ value and $C_i'$ is its $C$ value.

Referring to 4B, when a motion vector having a highest confidence is selected as a global motion vector from among candidate motion vectors according to the related art technology 1, the candidate motion vector #4 having a confidence 0.5, which is the highest from among the candidate motion vectors #1, #2, #3, and #4, becomes a global motion vector MV*, and a position of the global motion vector #4 is (5, 2). An ED between the global motion vector MV* and the TMV in the related art technology 1 is 10.12.

Also, when a result obtained by multiplying candidate motion vectors by confidences thereof to obtain resultant values and summing the resultant values is selected as a global motion vector according to the related art technology 2, (−0.5, 2), which is a result obtained by performing a weighted sum operation on positions (−7, 3), (−4, 2), (−4, −2), and (5, 2) of the candidate motion vectors #1, #2, #3, and #4 by using confidences 0.2, 0.3, 0.1, and 0.5 as weights, becomes a global motion vector MV*. An ED between the global motion vector MV* and the TMV according to the related art technology 2 is 4.92.

Also, when a result obtained by multiplying candidate motion vectors by confidences thereof to obtain resultant values and summing the resultant values according to the related art technology 3 is selected as a global motion vector, (1.3, 1.6), which is a result obtained by performing a weighted sum operation on positions (−4, 2) and (5, 2) of the two motion vectors #2 and #4 having the highest confidences from among the candidate motion vectors by using confidences 0.3 and 0.5 as weights, becomes a global motion vector MV*. An ED between the global motion vector MV* and the TMV according to the related art technology is 6.45.

The EDs of the global motion vectors calculated by the related art technologies 1 through 3 are 10.12, 4.92, and 6.45 which are considerably high. Since the EDs are higher than an ED of 2.23 obtained when a median (−4, 2) is simply selected as a global motion vector without considering each confidence, the global motion vector estimation accuracy is somewhat low.

Referring to FIG. 4C, the candidate motion vectors #1, #2, #3, and #4 according to the present embodiment respectively have positions (−7, 3), (−4, 2), (−4, −2), and (5, 2) and are respectively set to have confidences 0.2, 0.3, 0.1, and 0.5, like in FIG. 4A.

It is assumed that neighboring motion vectors of each of the candidate motion vectors #1, #2, #3, and #4 are other candidate motion vectors whose EDs from the candidate motion vectors #1, #2, #3, and #4 are equal to or less than 4.

Accordingly, the candidate motion vector #1 has the candidate motion vectors #2 and #3 as neighboring motion vectors, the candidate motion vector #2 has the candidate motion vectors #1 and #3 as neighboring motion vectors, the candidate motion vector #3 has the candidate motion vectors #1 and #2 as neighboring motion vectors, and the candidate motion vector #4 has no neighboring motion vectors.

Positions of the candidate motion vectors whose positions are corrected by performing a weighted sum operation on positions of the candidate motion vectors #1, #2, #3, and #4 and the neighboring motion vectors and confidences of the candidate motion vectors #1, #2, #3, and #4 and the neighboring motion vectors are (−5, 0.167), (−5, 0.167), (−5, 0.167), and (5, 2).

In addition, scores of the candidate motion vectors #1, #2, #3, and #4 calculated based on confidences of the candidate motion vectors whose positions are corrected and a number of the neighboring motion vectors are 3.2, 3.3, 3.1, and 0.5. In this case, a score weight W which is a constant value used to calculate the scores is calculated by using Equation 7.

$$W = 1.5 \left( \max_{i \in \Delta} C_i \right), \quad (7)$$

where $C_i$ is a confidence of each of the candidate motion vectors #1, #2, #3, and #4.

When the candidate motion vector #2 whose score is the highest score is selected as a global motion vector MV*, an ED between a position (−5, 0.167) of the candidate motion vector #2 and the TMV is 0.167. The ED of 0.167 is much lower than the EDs of FIG. 4B, and thus, it is found that global motion estimation accuracy according to the present embodiment is better than that of FIG. 4B.

Figure 5A:
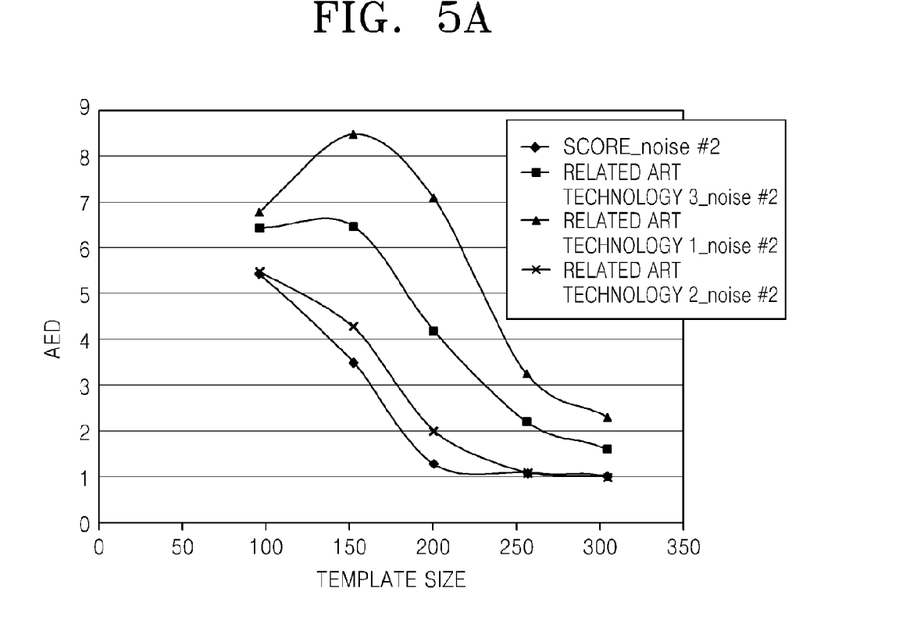
FIGS. 5A and 5B are graphs illustrating results of a global motion estimation test performed to show that the method of estimating the global motion according to the present inventive concept has a better motion estimation accuracy than the related art global motion estimation technologies.
Figure 5B:
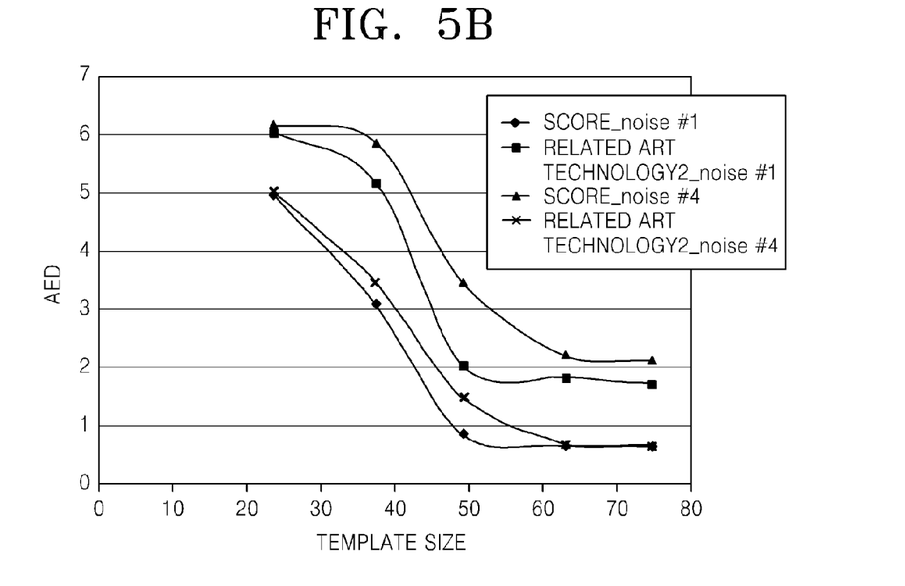

FIGS. 5A and 5B are graphs illustrating results of a global motion estimation test performed to show that the method of estimating the global motion according to the present embodiment has a better motion estimation accuracy than the related art global motion estimation technologies. Several results obtained by applying the related art technologies 1 through 3 and the method of estimating the global motion according to the present embodiment to image noise #1, noise #2, noise #3, and noise #4 having 4 degrees of noise and analyzing the global motion estimation accuracy are presented. In the test, it is assumed that the image noise #4, noise #3, noise #2, and noise #1 to be tested are enumerated in an order by a degree of noise.

FIG. 5A illustrates a result obtained by applying the related art technologies 1 through 3 and the method of estimating the global motion according to the present embodiment to the image noise #2 whose noise degree is next to the highest from among the image noise #1, noise #2, noise #3, and noise #4.

In FIG. 5A, the X-axis represents a template size. In a technology of calculating a global motion vector based on a plurality of candidate motion vectors like the related art technologies 1 through 3 and the method of estimating the global motion according to the present embodiment, the global motion estimation accuracy increases as the template size increases.

Also, in FIG. 5A, the Y-axis represents an average ED (AED) between a true motion measured by eyes for an object of the image frame and a global motion estimated by the related art technologies 1 through 3 and the method of estimating the global motion according to the present embodiment. The global motion estimation accuracy increases as the AED decreases.

Referring to FIG. 5A, when results of the global motion estimation performed on the image noise #2 whose noise degree is next to the highest from among the images #1, #2, #3, and #4 are compared between the related art technologies 1 through 3 and the method of estimating the global motion according to the present embodiment, the related art technology 2 and the present invention have better estimation accuracy than the related art technologies 1 and 3.

In addition, although the present embodiment and the related art technology 2 show similar results when the template size is 100 with a highest AED and 250 and 300 with a lowest AED, the method of estimating the global motion according to the present embodiment has a better estimation accuracy than the related art technology 2 when the template size is other than 100, 250, and 300 with AEDs between the highest AED and the lowest AED.

FIG. 5B illustrates a result obtained by applying the present embodiment and the related art technology 2 having a similar estimation accuracy at the template size with the highest AED and the template size with the lowest AED in the test of FIG. 5A to the image noise #1 whose noise degree is the highest and the image noise #4 whose noise degree is the lowest.

Referring to FIG. 5B, the global motion estimation performed on the image noise #1 whose noise degree is the highest has better estimation accuracy than global motion estimation performed on the image noise #4 whose noise degree is the lowest, and the present embodiment has a better estimation accuracy than the related art technology 2 in most cases of the template size.

Accordingly, when global motion estimation is performed according to the present embodiment, a better estimation accuracy than that of the related art global motion estimation technologies may be provided.

In particular, even when the template size used to extract candidate motion vectors is so small that a reliability of extracting the candidate motion vectors is low, a relatively excellent estimation accuracy may be provided.

Also, even when an image quality of a captured image is reduced due to a bad weather, a low communication speed of a network camera, noise of a thermal camera, or an out-of-focus shot, a global motion may be relatively accurately obtained.

In addition, since candidate motion vectors are extracted by using a plurality of templates defining different areas of an image frame and a global motion is estimated based on confidences of the candidate motion vectors, even when a moving object exists in a captured image, the global motion may be estimated based on the candidate motion vectors by using templates of other areas which are not affected by the moving object, and thus, the estimation is less affected by the moving object.

In addition, a method of estimating a global motion according to the present inventive concept may be applied to a video compression standard such as H.264 or a particle filter and target detect in moving image as well as stabilization of a captured image. It will be understood by one of ordinary skill in the art that various image processing methods including a motion estimation function may be derived by referring to and/or modifying the method of estimating the global motion according to the present inventive concept and the present inventive concept includes all image processing methods derivable from the embodiments of the present inventive concept without being limited to the embodiments of the present inventive concept.

The present inventive concept may be embodied as computer-readable codes on a non-transitory computer-readable recording medium. The non-transitory computer-readable recording medium may be any recording device capable of storing data that is read by a computer system. Examples of the computer-readable recording medium include read-only memory (ROM), random-access memory (RAM), CD-ROM, a magnetic tape, floppy disk, and optical data storage device. The non-transitory computer-readable recording medium may also be a carrier wave that transmits data via the Internet, for example. The non-transitory computer readable medium may be distributed among computer systems that are interconnected through a network, and the present invention may be stored and implemented as computer readable codes in the distributed system. Functional programs, codes, and code segments for embodying the present invention may be easily derived by programmers in the technical field to which the present inventive concept pertains.

According to the present inventive concept, even when a moving object or much noise exists in the captured image, or the image quality is not good, a global motion vector representing a global motion of an image frame may be more accurately estimated than by using related art global motion estimation technologies.

While the present inventive concept has been particularly shown and described with reference to exemplary embodiments thereof, they are provided for the purposes of illustration and it will be understood by those of ordinary skill in the art that various modifications and other equivalent embodiments can be derived from the inventive concept. Accordingly, the true technical scope of the inventive concept is defined by the technical spirit of the appended claims.

What is claimed is:

1. A digital image processing apparatus comprising:
   a template motion vector obtaining unit configured to obtain template motion vectors respectively corresponding to a plurality of templates of a plurality of different areas in an image frame of a captured image;
   a position correcting unit configured to correct a position of each of the template motion vectors based on a weighted sum of each of the template motion vectors and at least one neighboring motion vector neighboring each of the template motion vectors;
   a score calculating unit configured to calculate a score of each of the template motion vectors based on a confidence of each of the template motion vectors and a number of the at least one neighboring motion vector corresponding to each of the template motion vectors; and
   a global motion estimating unit configured to select a global motion vector representing the image frame from among the template motion vectors, based on the score calculated by the score calculating unit.

2. The digital image processing apparatus of claim 1, wherein the template motion vector obtaining unit is further configured to match the image frame to the plurality of templates to obtain the template motion vectors.

3. The digital image processing apparatus of claim 1, wherein the weighted sum is calculated by using a confidence of each of the template motion vectors and a confidence of each of the at least one neighboring motion vector corresponding to each of the template motion vectors.

4. The digital image processing apparatus of claim 1, wherein each of the at least one neighboring motion vector is a motion vector whose Euclidean distance from a template motion vector corresponding to the at least one neighboring motion vector is less than a threshold value.

5. The digital image processing apparatus of claim 1, further comprising a stabilizing unit configured to stabilize the captured image comprising the image frame based on the global motion vector.

6. The digital image processing apparatus of claim 5, wherein the stabilizing unit is configured to stabilize the captured image by moving the image frame according to the global motion vector.

7. The digital image processing apparatus of claim 5, wherein the stabilizing unit is configured to stabilize the captured image by correcting data of the image frame according to the global motion vector.

8. A method of estimating a global motion of an image, the method comprising:
   obtaining template motion vectors respectively corresponding to a plurality of templates of a plurality of different areas in an image frame of a captured image;
   correcting a position of each of the template motion vectors based on a weighted sum of each of the template motion vectors and at least one neighboring motion vector neighboring with each of the template motion vectors;
   calculating a score of each of the template motion vectors based on a confidence of each of the template motion vectors and a number of the at least one neighboring motion vector corresponding to each of the template motion vectors; and
   selecting a global motion vector representing the image frame from among the template motion vectors, based on the score calculated by the score calculating unit.

9. The method of claim 8, further comprising matching the image frame to the plurality of templates to obtain the template motion vectors.

10. The method of claim 8, wherein the weighted sum is calculated by using a confidence of each of the template motion vectors and a confidence of each of the at least one neighboring motion vector corresponding to each of the template motion vectors.

11. The method of claim 8, wherein each of the at least one neighboring motion vector is a motion vector whose Euclidean distance from a template motion vector corresponding to the neighboring motion vector is less than a threshold value.

12. The method of claim 8, further comprising stabilizing the captured image comprising the image frame based on the global motion vector.

13. The method of claim 12, wherein the stabilizing the captured image comprises stabilizing the captured image by moving the image frame according to the global motion vector.

14. The method of claim 12, wherein the stabilizing the captured image comprises stabilizing the captured image by correcting data of the image frame according to the global motion vector.

15. A non-transitory computer-readable recording medium having recorded thereon a program for executing the method of claim 8.

16. A non-transitory computer-readable recording medium having recorded thereon a program for executing the method of claim 10.

17. A non-transitory computer-readable recording medium having recorded thereon a program for executing the method of claim 11.

18. A non-transitory computer-readable recording medium having recorded thereon a program for executing the method of claim 12.

* * * * *